United States Patent [19]

Hopkins et al.

[11] Patent Number: 5,345,347

[45] Date of Patent: Sep. 6, 1994

[54] DISK DRIVE WITH REDUCED POWER MODES

[75] Inventors: Donn A. Hopkins, Irvine; Kenneth D. Donner, Laguna Niguel; Marc B. Goldstone, Irvine; Dung T. Nguyen, Fountain Valley; Rudolf Wiegand, Fremont; David E. McKinley, San Jose, all of Calif.

[73] Assignee: Western Digital Corporation, Irvine, Calif.

[21] Appl. No.: 836,775

[22] Filed: Feb. 18, 1992

[51] Int. Cl.⁵ ............................................... G11B 19/00
[52] U.S. Cl. ......................................... 360/71; 360/75
[58] Field of Search ............... 360/69, 75, 77.02, 71, 360/73.01, 74.1

[56] References Cited

U.S. PATENT DOCUMENTS

| | | | |
|---|---|---|---|
| B1 4,638,383 | 11/1988 | McGinlay et al. | 360/77 |
| 4,458,273 | 7/1984 | Johnson | 360/74.1 |
| 4,568,988 | 2/1986 | McGinlay et al. | 360/77 |
| 4,611,289 | 9/1986 | Coppola | 371/66 |
| 4,635,145 | 1/1987 | Horie et al. | 360/75 |
| 4,717,968 | 1/1988 | Painton et al. | 360/69 |
| 4,737,867 | 4/1988 | Ishikawa et al. | 360/75 |
| 4,899,231 | 2/1990 | Maeda et al. | 360/33.1 |
| 4,933,785 | 6/1990 | Morehouse et al. | 360/78.04 |
| 5,001,578 | 3/1991 | Yamauchi | 360/69 |
| 5,140,571 | 8/1992 | Nishida et al. | 360/77.02 |

Primary Examiner—Louis J. Casaregola
Attorney, Agent, or Firm—Graham & James

[57] ABSTRACT

A method for controlling a rotating disk magnetic data storage device employing several reduced power modes which are automatically entered and exited under the control of the rotating disk device microcontroller. Two modes are provided which are fully responsive to host computer commands, and are thereby transparent to the host computer user, all providing significant power savings. An additional full power down mode is provided which can be initiated by a command from the host computer user, wherein the operational state parameters of the rotating disk device are stored in the host computer until the host computer powers on the device. At this time the stored state parameter are restored into the rotating disk device allowing it to resume its operational state immediately prior to the power suspension. Additionally, a reduced power startup procedure is provided where a low current start is first attempted, which will be successful in a high percentage of attempts, followed by a higher current attempt if the first attempt is unsuccessful. A portion of the drive circuitry is disabled during the startup procedure to further save energy.

27 Claims, 11 Drawing Sheets

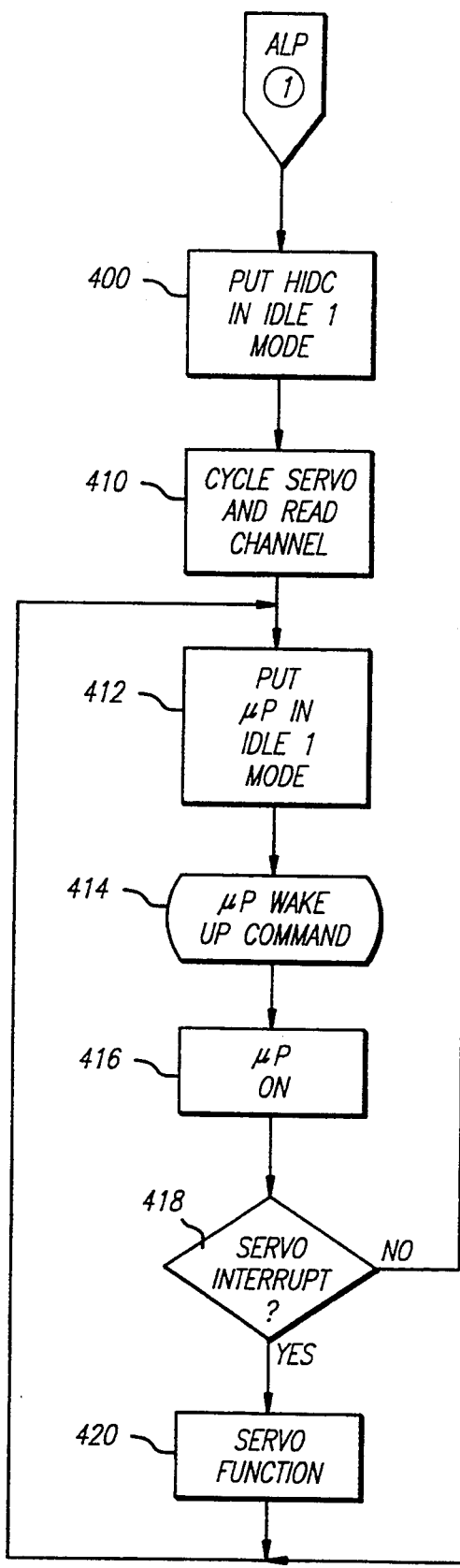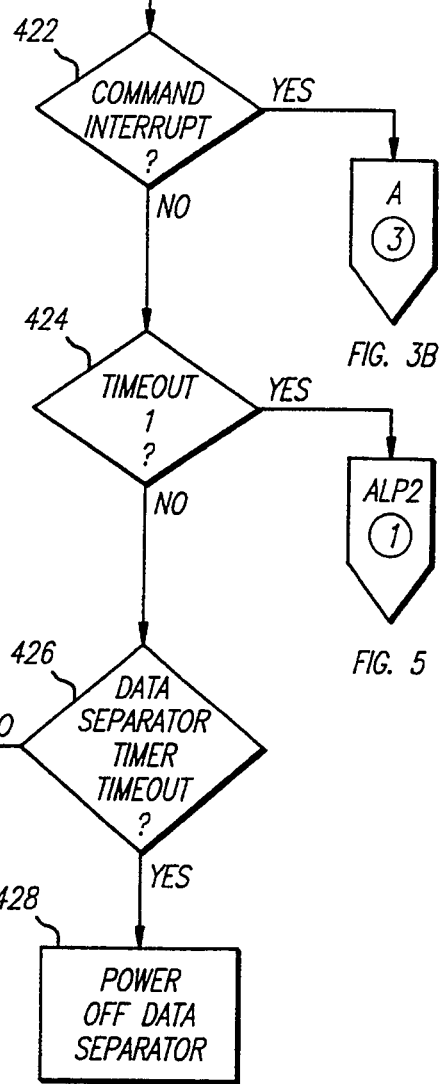
FIG. 4

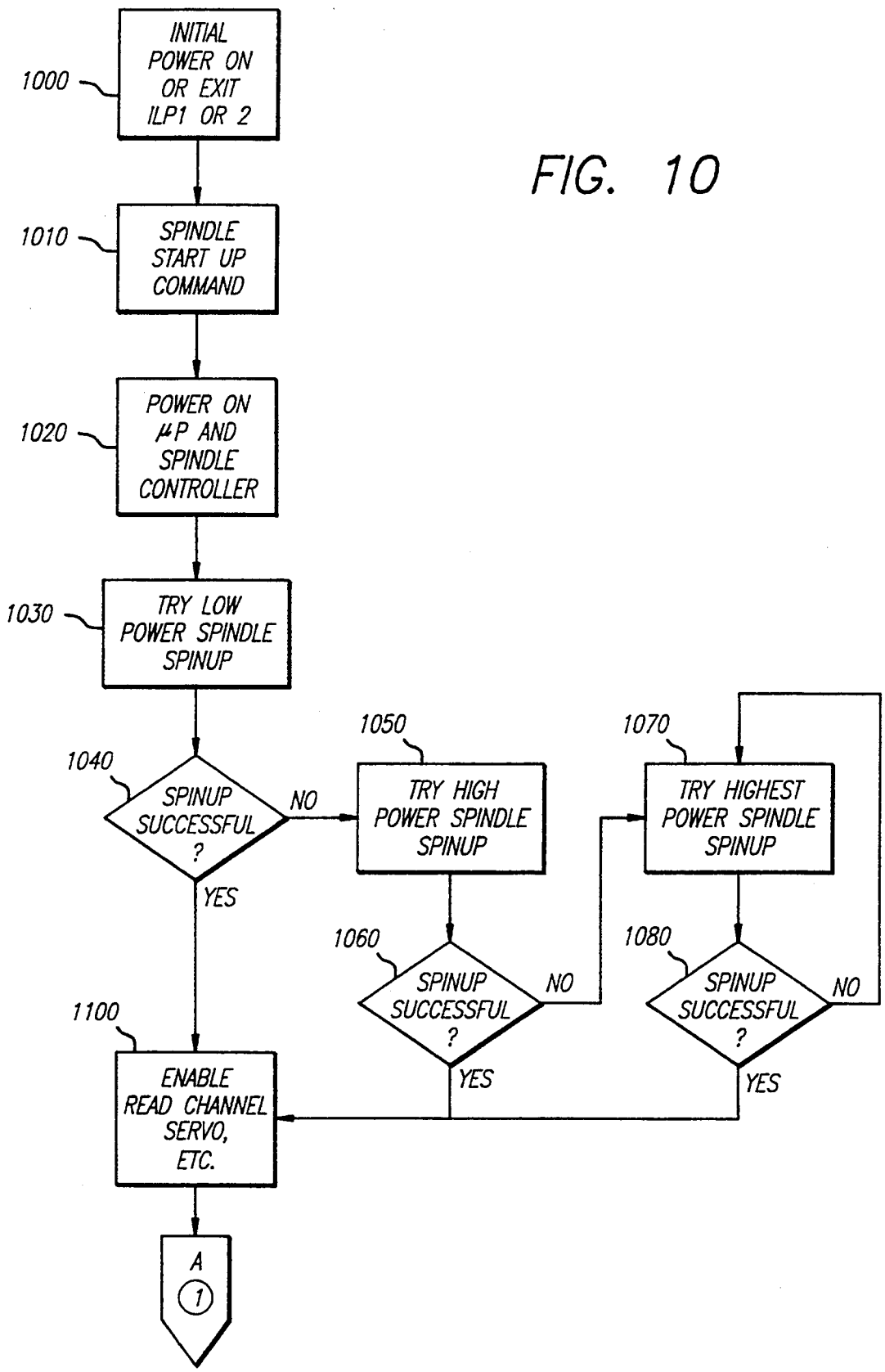

DISK DRIVE WITH REDUCED POWER MODES

BACKGROUND OF THE INVENTION

1. Field of the Invention

The present invention relates to data storage devices. More particularly, the present invention relates to rotating disk magnetic data storage devices.

2. Description of the Prior Art and Related Information

Rotating disk magnetic data storage devices, commonly referred to as disk drives, have undergone dramatic improvements in data storage capacity and data access times in recent years. At the same time, high performance, battery powered portable computers have become increasingly prevalent. Such portable computers require a high data storage capability in an environment limited in size and available power. These constraints imposed by such battery powered portable computers have provided a significant need for high performance disk drives having reduced power requirements.

Of the basic components of the disk drive, the actuator motor which drives the actuator which supports the read/write transducer heads, the spindle motor which rotationally drives the data storage disks, and the associated drive electronics, consume the most power. More specifically, the actuator motor, and associated motor driver and servo electronics, consume significant amounts of power both during track "seek" operations and "track following". Track seek operations, where the actuator moves the read/write heads to a desired track, require significant power since high acceleration/deceleration is desired to reach the destination track in minimum time. Track following also requires significant power since maintaining the read/write heads over a desired track requires continual adjustments by the actuator motor and servo electronics to offset drift and disturbing forces. The spindle motor in turn requires significant power to drive the data disks at a preferred speed during data input/output and track following operations. In particular, during start-up of the disk drive significant power is required by the spindle motor to overcome stiction to "fly" the read/write transducer heads.

Accordingly, for portable personal computers, which utilize batteries to provide electrical power, it should be appreciated that continuous operation of a high capacity disk drive may be very power intensive, significantly limiting useful computer time between battery replacement or recharging.

Further, all of the electrical components in the disk drive which are utilized during various drive operations generate heat. The generation of heat may require cooling means, such as fans, for the host computer requiring additional power. Also, high density integrated circuits are sensitive to temperature and the heat generated during power intensive disk drive operations may degrade the performance of the drive's integrated circuits. Thus, it is beneficial to minimize the power requirements of disk drives even for use with desktop computers or other computers not limited to battery power supplies.

An additional very important consideration for modern disk drives relates to maintaining high speed access to information stored on the disks. Thus, it is important that the power saving considerations be tempered with the need to have rapid access to data. Accordingly, any reduction in the power of operation of the disk drive should be accomplished in a manner whereby the impact on the speed of data access of the machine is minimized.

Accordingly, a need presently exists for a disk drive which avoids the above-noted problems.

SUMMARY OF THE INVENTION

The present invention provides a disk drive having reduced power consumption while providing performance substantially the same as a more power intensive drive of the same configuration.

The present invention thus provides a disk drive which is suited for use with portable battery powered computers and which provides increased battery life. Additionally, the present invention provides a disk drive which generates less heat than conventional disk drives and is suitable for desktop and other computers employing high density circuits.

More specifically, the disk drive of the present invention provides improved power conservation by employing a control system which allows the disk drive to automatically enter and operate in reduced power modes when the drive is not actively reading or writing data in response to commands from the host computer. The power savings in these modes are achieved by selectively disabling certain electrical components of the disk drive. In particular, these electrical components include spindle controller, actuator controller and servo controller circuitry, which control operation of the spindle motor, actuator motor, and read/write head positioning, respectively. These controller circuits are in turn under the control of a drive microcontroller which is programmed to control entry and exit from the reduced power modes, and to enable/disable the associated electrical drive components, in response to specific time intervals and host commands.

In a preferred embodiment, when the drive is not executing a host read/write command, the drive automatically enters a power conserving operational mode while nonetheless remaining able to immediately respond to host commands requiring data input or output from the drive. In a preferred embodiment, two such modes, ACTIVE LOW POWER 1 and ACTIVE LOW POWER 2, requiring successively less power from the host computer power supply, are provided. In ACTIVE LOW POWER 1, the read/write heads are maintained over the last data track accessed by the drive, however, the servo system is cycled on and off to reduce power consumption. In the second low power active mode, ACTIVE LOW POWER 2, the actuator motor and servo controller electrical components are disabled, and the actuator is allowed to freely position itself in equilibrium over the disk. Alternatively, the actuator may be held, by a slight drive current, against the outer mechanical stop adjacent track "0" or the inner portion of the disks, against the inner stop/latch. The entry into these low power modes of operation is dependent upon the lapse of inactivity timeout periods which may be preset in the drive or set by the user. Preferably the transition from the ACTIVE mode to the ACTIVE LOW POWER 1 mode is made following completion of execution of a command from the host computer. ACTIVE LOW POWER 2 in turn is preferably entered after an inactivity timeout period of, e.g., several seconds. Both ACTIVE LOW POWER 1 and ACTIVE LOW POWER 2 are completely transparent to the host computer since the disk drive can respond immediately to host commands and these modes thus appear substantially identical to a full power operational state in their performance characteristics.

Additionally, at least two inactive operational modes are preferably provided. In the first, INACTIVE LOW POWER 1, entered immediately in response to a special host command, the data storage disks are not rotating and data stored on the disks are thus not immediately accessible. Also, selected circuits are running at minimum power or are shut off. Nonetheless, the drive may accept host commands as in a full power state but a latency period is required for spinup of the spindle motor. In addition to immediately entering this mode in response to a host command to do so, the mode may optionally be entered by an elapsed inactivity period preset in the drive or set by the user (for example, several minutes).

The second inactive mode, INACTIVE LOW POWER 2, is preferably entered only in response to a host command. In this mode the spindle is allowed to spin down, and the actuator is parked and turned off, as in INACTIVE LOW POWER 1. However, the disk drive is not responsive to host commands other than a reset command necessary to activate the disk drive and to transition it to an operational state capable of accepting data access commands from the host computer.

In a further feature of the present invention, a complete power shut down of the disk drive may also be provided, initiated by the host computer; e.g. by the host computer simply shutting off the disk drive power supply. Despite the complete power shut down, the disk drive can automatically resume the operational state which the disk drive had immediately prior to being powered down by the host computer. This capability is achieved by storing the basic parameters defining the operational state of the disk drive in a buffer memory in the disk drive upon receipt of a command from the host computer indicating drive operation is to suspended. For example, these operational state parameters may preferably include the cylinder and track over which the read/write heads were positioned prior to receipt of the command, the enable/disable status of the electrical components of the disk drive, and the status of key registers in the drive circuitry. These operational state parameters are then transferred from the disk drive and stored in the host computer, or stored in a non-volatile manner within the disk drive before the host initiates the power down of the disk drive. Upon a resume command being made by the user, the host computer first powers on the disk drive, and, immediately after power on of the disk drive, transfers the operational state data stored in the host computer into the disk drive, or the state data is restored from the non-volatile memory within the disk drive. The host then issues a resume command to the disk drive and the state data is used by the drive to restore the operational state of the disk drive precisely to its state prior to the host computer power down of the drive. After completion of the resume sequence, the disk drive is thus ready to respond to host commands where the last command left off.

In a further feature of the present invention, power up of the disk drive from a reduced power mode may be avoided entirely while still responding to a host data request. More specifically, during operation of the disk drive data read from the disk surface is cached in a buffer memory after each host data request. For example, the disk drive may cache the data requested by the host computer as well as one or more segments of data on the disk. Upon a subsequent host data request command being issued to the disk drive, the cached data is checked to see if it matches that requested by the host computer. If a match is found, the cached data is forwarded to the computer while the disk drive returns to an ACTIVE mode. Since frequently the data requested by the host computer merely duplicates, or is an extension of, the data being accessed prior to the delay, the cached data will often provide the requested data. Thus, the computer request may be fulfilled without the delay associated with the disk drive powering up from the low power mode.

In another feature of the present invention, a reduced power spindle start-up procedure is provided. It will be appreciated from the foregoing that in addition to initial power on of the disk drive, spindle start-up is required upon entry into the active mode from any of the inactive operational modes. Since in the course of extended usage of a host computer by the operator, the drive may enter and exit one of these inactive modes a number of times, the power usage associated with spinup of the spindle motor and rotation of the disks can be significant. In this regard, sufficient power must be provided to the spindle motor during start up to overcome inertia and frictional forces, such as stiction between the disk surface and the read/write transducer heads which may be resting on the disk surfaces in a landing zone. That is, an initial surge of power is needed to "fly" the heads above the disk surface in accordance with standard Winchester disk drive air bearing technology. Although it is necessary to ensure that sufficient power is provided to overcome these forces, such as stiction between the read/write heads and the disk surfaces, Applicants have found that a relatively low power spindle startup will be successful in a high percentage of attempts to spinup a disk drive. In the reduced power spindle motor startup procedure of the present invention, such a low power startup is first attempted. If this is unsuccessful to fly the read/write heads, spindle startup is retried at a higher power level. The lower power level is chosen to be successful in a high percentage of attempts, and as a result, the net power savings of the low power startup technique may be significant.

The present invention further reduces power during the drive start up by inhibiting certain electrical components during this time. More specifically, since the disk drive does not read data during the startup procedure, the electrical components of the read function and the actuator positioning system are inhibited during the startup procedure to save power during this procedure. Since the spindle startup procedure typically takes several seconds, the power saving due to the disabling of the read channel and servo circuitry may be significant, especially where several spindle startup operations are required due to power ups from inactive modes.

The present invention thus provides a high performance disk drive, adapted for use with a portable host computer, having reduced power requirements thereby extending the useful battery charge time of the host computer. The present invention further provides a disk drive with reduced heat generation which is thus suited for use with host computers having high density circuit components. Further features and advantages of the present invention will be appreciated by a review of the following detailed description of the invention.

BRIEF DESCRIPTION OF THE DRAWINGS

FIG. 4 is a flow chart of a preferred embodiment of the ACTIVE LOW POWER 1 mode.

FIG. 10 is a flow chart of a caching procedure in accordance with a preferred embodiment of the present invention.

DETAILED DESCRIPTION OF THE INVENTION

Figure 1:
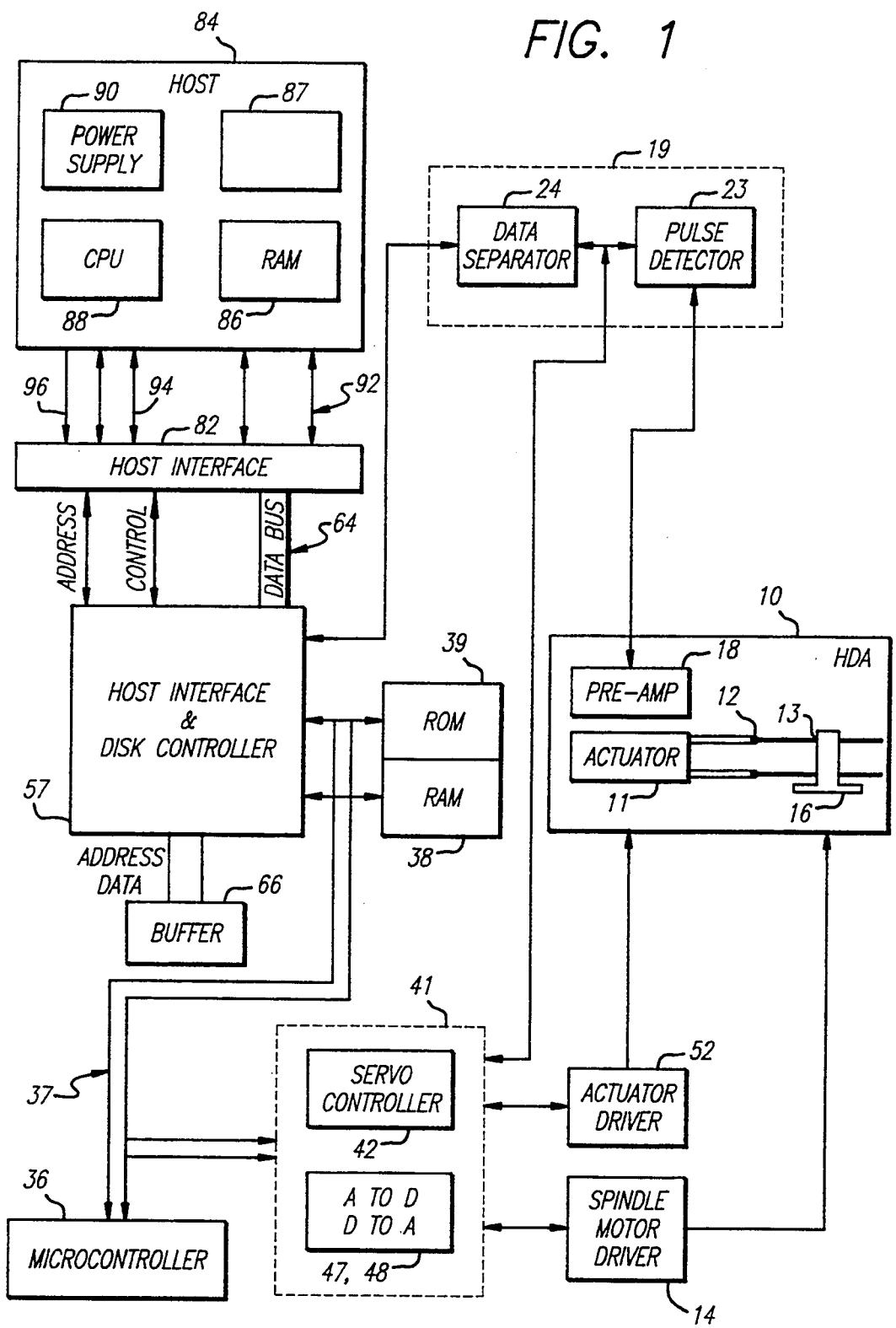
FIG. 1 illustrates the mechanical and electrical components of a disk drive system in which the reduced power modes of operation of the present invention may preferably be employed.

In FIG. 1, the electrical and mechanical components of a disk drive in accordance with a preferred embodiment of the present invention are illustrated.

Referring to FIG. 1, the disk drive includes a head/disk assembly (HDA) 10 having therein an actuator motor 11, which may preferably be a voice coil type, which positions one or more read/write heads 12 (four of which are shown in FIG. 1) to different radial positions relative to the surfaces of disks 13 (two of which are shown in FIG. 1). HDA 10 also includes read/write preamplifier and head multiplexor circuitry 18 for controlling the writing of data, and the reading of data and servo information, from the disk surfaces. Read/write preamplifier and head multiplexor 18 may be a commercially available integrated circuit; e.g. a type SSI 4670 circuit manufactured by Silicon Systems, Inc. of Tustin, Calif. That device provides a write current to be supplied to the particular one of heads 12 selected for writing. The device 18 also contains a read preamplifier and read buffer for supplying read data from the particular head selected for reading. A mode select signal determines whether the device is to operate in a read mode or a write mode.

Read channel/data separator circuitry 19 receives analog read data from circuitry 18 in the HDA. Read channel 19 includes a read channel analog filter (not shown) which supplies the analog signal to a pulse detector 23. The output of pulse detector 23 is supplied to a data separator 24 as raw digital read data.

The disk drive circuitry components interface with a microcontroller 36 through a bus 37 which carries address, control and data information, as is well known in the art. Microcontroller 36 may preferably be a commercially available microcontroller, for example, an Intel 80C196 microcontroller. Microcontroller 36 has access to a random access memory (RAM) 38, which may be internal or external to the microcontroller 36, and a read only memory (ROM) 39, which may also be internal or external to microcontroller 36, as is common in the microcontroller art. Microcontroller 36 preferably has the capability to operate in one or more reduced power modes. For example, the noted Intel microcontroller has two reduced power modes IDLE1 and IDLE2.

The disk drive control electronics further include a servo controller section 41 for detecting and processing servo information from one or more disks 13 relating to servo bursts, SYNC pulses and cylinder or track ID number indicating the radial position of heads 12 relative to the disk surface. Servo section 41 connects to microcontroller 36 through bus 37 and operates to control the flow of information relative to servo read timing and control. Servo controller section preferably includes servo controller 42, analog-to-digital (A-to-D) converter circuitry 47 and digital-to-analog converter (DAC) circuitry 48.

The analog output from servo controller section 41 is supplied as an input to the actuator driver circuitry 52. Circuitry 52 includes power amplifier control circuitry which supplies an actuator drive signal to a power amplifier (not shown) which in turn supplies control current to actuator motor 11 in HDA 10. Actuator driver circuitry 52 receives power from spindle motor 16 created by the back E.M.F. of spindle motor 16, which is used to supply power in automatic actuator retract operations when the drive power supply is removed. The system shown in FIG. 1 also includes spindle motor control driver circuitry 14 for controlling the spindle drive motor assembly 16 in HDA 10 for rotating magnetic disks 13.

The disk drive also includes a host interface and disk controller section 57. As is well known in the art, host interface and disk controller (HIDC) section 57 operates to provide control and information paths between a host computer 84, through a bus 64 and host interface 82, and the elements shown in FIG. 1 through bus 37. A buffer memory 66 is preferably provided to accommodate differences in data flow rates between the HIDC and host and HIDC and drive. HIDC circuitry 57 may preferably be provided with one or more reduced operating modes. For example, an Idle 1 mode may be provided where the host interface portion of HIDC 57 is fully active and the disk controller portion is inactive, and an Idle 2 mode may also be provided where the interface portion is also inactive except to receive a limited number of reset commands.

Each of the electrical components illustrated in FIG. 1 may preferably be capable of being placed in an inactive or reduced power state by microcontroller 36. For example, a disable/enable command may be provided for each device, or for a functional "group" of devices. For Complimentary Metal Oxide Semiconductor (CMOS) devices, the clock signals provided to the device or, to functional circuit blocks within the device, may be inhibited to reduce the power consumption. Alternatively, the power supply to each device may simply be interrupted under the control of the microcontroller 36.

Host computer 84 will include an operating memory RAM 86, a CPU 88, a power supply 90 as well as other standard components such as keyboard, monitor, etc. (not shown). Host 84 may also preferably have a suspend/resume button 87 which is used by the user to suspend disk drive functions. The host 84 communicates with the drive via data bus 92 and command control lines 94. Additionally, the host supplies power to the disk drive through line 96.

Before entering into a specific discussion of the various reduced power modes of operation of the disk drive, it is beneficial to understand the environment in which the disk drive is operating. In portable laptop computers, as well as desktop computers, the disk drive is used to store large volumes of data. From time to time throughout the course of using the host computer, data stored on the hard disks will be required by the host computer. During the course of data input/output from the hard disks, the entire disk drive electrical and mechanical assembly illustrated in FIG. 1 will be operational. In particular, data input/output requires that the spindle motor is driving the disks 12 and that the actuator 11 and actuator driver 52 is operative to seek to a track to locate data stored on the disks and the read channel 19 is active to read or write data to or from the disk. The other circuitry within the HDA 10, including microcontroller 36 and HIDC 57, will also be required to be powered up in order to perform the logic and control functions required of the hard disk assembly in locating data.

However, it should be appreciated that during a large percentage of the time during which the operator of the computer is working with various programs and data, there will be no data input/output requests made of the disk drive. Additionally, during normal operation of a laptop or desktop computer there will often be times when the operator will be engaged in activities which the operator recognizes will require a relatively substantial amount of time during which the disk drive storage capability will not be required. Accordingly, at these times, the operator of the computer may activate suspend button 87 to power down non-essential functions, including HDA 10. Alternatively, the host computer may include hardware/software which automatically issues a suspend command after a specified inactivity period.

The present invention provides several tiered modes of power consumption for those times during the operation of the host computer wherein high speed access of data from the hard disk assembly will not be required as well as providing reduced power at times when relatively high speed access may be required. Balancing the data access speed against the power saving requirement is a key aspect of the power saving modes of operation of the present invention.

Figure 2:
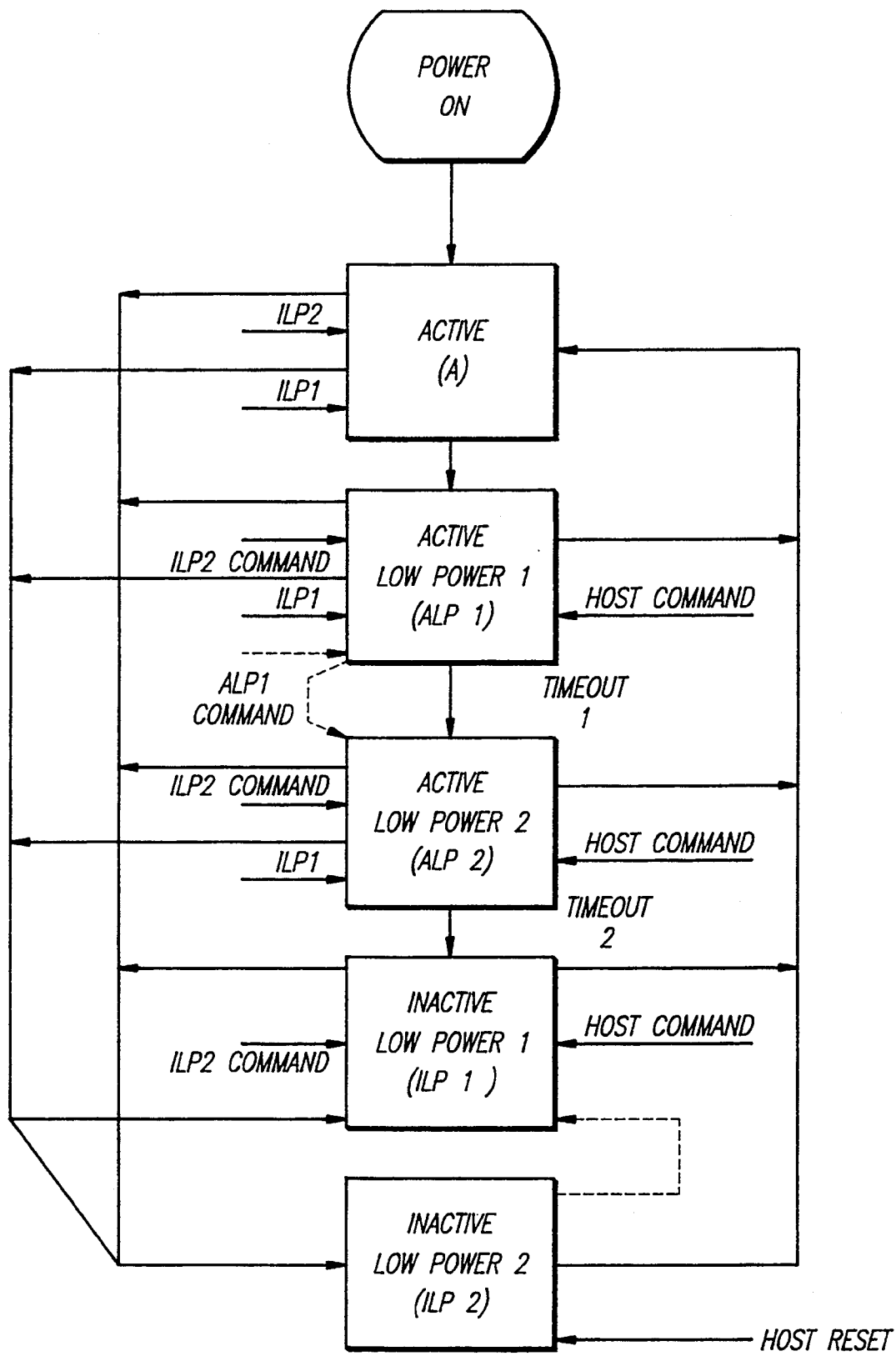
FIG. 2 is a diagram showing the basic active and inactive operational modes of the present invention, and their entry and exit sequence.

Referring to Table 1, Table 2 and FIG. 2, the five basic operational states of the disk drive, their entry and exit sequence, and power usage characteristics, are set out for a preferred embodiment.

TABLE 1

|  | ACTIVE MODE | ACTIVE LOW POWER MODE 1 (ALP1) | ACTIVE LOW POWER MODE 2 (ALP2) | INACTIVE LOW POWER MODE 1 (ILP1) | INACTIVE LOW POWER MODE 2 (ILP2) |
| --- | --- | --- | --- | --- | --- |
| Mode Entry | Power on or from ALP1, ALP2, ILP1 or ILP2 when Host command is received. | Immediately after Host command completion. | When command ALP2 is received or after inactivity timeout from ALP1. | After timeout period 2 or when ILP1 Host command is received (or from ILP2). | When Host command ILP2 is received. |
| Mode Exit | After Host command completion. | When new Host command is received or after timeout period 1. | When new command is received or after timeout period 2. | When Host command is received. | When hardware or software reset is received. |
| Drive Status | Ready: host interface active, spindle and disks spinning at full speed, actuator is track following, and read/write channel active. | Ready: host interface is active, disks spinning and actuator is track following. | Ready: host interface is active, media spinning, actuator is disabled. | Ready with latency period: host interface is active, disks and spindle stopped, actuator is parked. | Not ready: host interface inactive except for reset, spindle stopped, actuator is parked. |
| Access Time | Access command in progress. | Command execution will begin immediately if command is received within fixed time of last command (e.g. ½ sec.) otherwise there will be a slight (3 ms) wait during turn on of portion of read channel. | Command execution will be delayed to activate circuits and position the actuator. | Command execution will be delayed to activate circuits, spinup the spindle and position the actuator. | Hardware or Software reset required, commands will be ignored until after reset, execution will be delayed to activate circuits, spinup the spindle and disks and position the actuator. |
| Power Status | Maximum, all circuits active. (See Table 2) | Reduced, only circuits necessary to maintain spindle speed, host interface and track following are active. (See Table 2.) | Reduced, only circuits necessary to maintain spindle speed and host interface are active. (See Table 2.) | Reduced, only circuits necessary to maintain host interface are active. (See Table 2.) | Minimum, only reset circuit and μp RAM are active to respond to reset. (See Table 2.) |

TABLE 2

| CIRCUIT | ACTIVE MODE | ACTIVE LOW POWER 1 (Track Following) | ACTIVE LOW POWER 2 (ALP2) | INACTIVE LOW POWER 1 (ILP1) | INACTIVE LOW POWER 2 (ILP2) |
| --- | --- | --- | --- | --- | --- |
| HIDC | ON | IDLE1 | IDLE1 | IDLE1 | IDLE2 |
| Data Sep. | ON | OFF: (D to A ON) | OFF | OFF | OFF |
| Servo | ON | CYCLE | OFF | OFF | OFF |

TABLE 2-continued

| CIRCUIT | ACTIVE MODE | ACTIVE LOW POWER 1 (Track Following) | ACTIVE LOW POWER 2 (ALP2) | INACTIVE LOW POWER 1 (ILP1) | INACTIVE LOW POWER 2 (ILP2) |
|---|---|---|---|---|---|
| A to D |  |  |  |  |  |
| D to A | ON | ON | D to A ON | OFF | OFF |
| Pulse Detector | ON | CYCLE | OFF | OFF | OFF |
| Pre Amp | ON | CYCLE | OFF | OFF | OFF |
| $\mu p$ | ON | ON | ON/IDLE1 | IDLE2 | IDLE2 |
| Actuator Driver | ON | ON | OFF | OFF (PARKED) | OFF (PARKED) |
| Spindle Driver | ON | ON | ON | OFF | OFF |
| Spindle Motor | ON | ON | ON | OFF | OFF |
| Actuator Motor | ON | ON | OFF | OFF | OFF |

The highest power operating state is the ACTIVE mode (A) in which the disk drive is fully operational. The disk drive will be in the ACTIVE mode after power on of the drive and whenever a host data access or write command is received. When the disk drive is on, and a host command is not being executed, the host computer user would typically expect the drive to be fully operational (ACTIVE) and ready to receive and act on a host command.

The present invention provides two lower power, drive initiated, modes which nonetheless appear to the host to be fully active drive modes. More particularly, following completion of execution of a host data input or output command, the disk drive proceeds immediately to a first low power mode; ACTIVE LOW POWER 1 (ALP1). In the ALP1 mode, the host interface circuitry is fully operational and the last data track accessed by the disk drive read/write heads in response to a host command is actively followed. Thus a read/write command can be rapidly executed. Nonetheless power savings are provided by duty cycling the drive read channel 19 and preamp 18 and servo controller 42. For example, a 15 to 30% on, 70 to 85% off duty cycle may nonetheless actively maintain track following. Additionally, the HIDC 57 may be partially disabled to the Idle 1 state, while retaining full host interface capability.

After a set period of inactivity has elapsed (timeout period 1), the disk drive automatically transfers into a second lower power mode; ACTIVE LOW POWER MODE 2 (ALP2). Timeout period 1 may be preset in the drive or set by the user and may preferably be 2 to 100 seconds. In ALP2 the drive spindle motor and disks remain spinning and the host interface is active (Idle1) and ready to respond to all host commands in a normal manner. However, in ALP2 in contrast to ALP1, the active track following is stopped. For example, the servo control circuitry and actuator driver circuitry may simply be disabled allowing the actuator to assume an equilibrium position over the disk surface. Alternatively, a small drive current may be supplied to the actuator motor to bias it against the outer mechanical stop of the HDA, adjacent track "0".

Following the receipt of a host command "ILP1" while in any mode, or optionally after lapse of a predetermined amount of inactivity time (timeout period 2), the disk drive transfers from ALP2 to a first INACTIVE LOW POWER mode (ILP1). In ILP1, in addition to the circuitry disabled in ALP2, the spindle and actuator are disabled, the drive is allowed to spin down and the actuator is parked. Also, the microcontroller 36 is preferably placed in a low power (Idle 1) state. Nonetheless, in ILP1, the host interface is active at level Idle 1 and the disk drive responds to all host commands. However, commands that require disk access have a longer command latency than normal since the disk drive must be "spun up" to execute the command.

In response to a host command "ILP2", while in any mode, the disk drive transfers immediately into INACTIVE LOW POWER MODE 2 (ILP2). In ILP2, the read channel is disabled, the servo section is disabled, the spindle motor is spun down, the actuator is latched, and the microcontroller is placed in an Idle 1 state. Also, the HIDC is placed in a second Idle state, Idle 2, and does not respond to host commands other than a reset issued by the host computer. In response to such a host reset command the drive may optionally first transition to ILP1 (as shown by the dashed lines in FIG. 2) where the disk drive waits for the host command, or transition directly to the ACTIVE mode.

Each of the alternative power modes of operation can thus transfer to the ACTIVE mode, however, the lag time for allowing data input and output in the ACTIVE POWER mode following one of the reduced power modes increases as the operative state proceeds from ILP 1, ALP2 TO ILP 2.

In addition to the power savings in the above-noted mode ALP1, ALP2, ILP1 and ILP2, the present invention provides some power savings even when a non-read/write command is being executed. These ACTIVE non-read/write states are illustrated in Table 3. Two of these low power "ACTIVE" states, spinup and cache, are discussed in detail below. In the third state in Table 3, seek, some power savings are achieved by duty cycling the servo and read channel and by placing the microcontroller in the Idle 1 mode while the actuator moves the read/write heads to a desired data track.

TABLE 3

| | OTHER ACTIVE MODES | | |
|---|---|---|---|
| CIRCUIT | SPIN UP STATE | SEEK STATE | CACHE |
| HIDC | IDLE1 | IDLE1 | ON |
| Data Sep. | OFF | OFF: DAC ON | OFF |
| Servo | SPINDLE ONLY ON | CYCLE | SPINDLE OFF |
| A to D |  |  |  |
| D to A | D to A ON | ON | OFF |
| Pulse Detector | OFF | CYCLE | OFF |
| Pre Amp | OFF | CYCLE | OFF |
| $\mu p$ | ON | ON | ON |
| Actuator Driver | OFF | ON | OFF |
| Spindle Driver | ON | ON | OFF |
| Spindle Motor | ON | ON | OFF |
| Actuator Motor | OFF | ON | OFF |

Figure 3A:
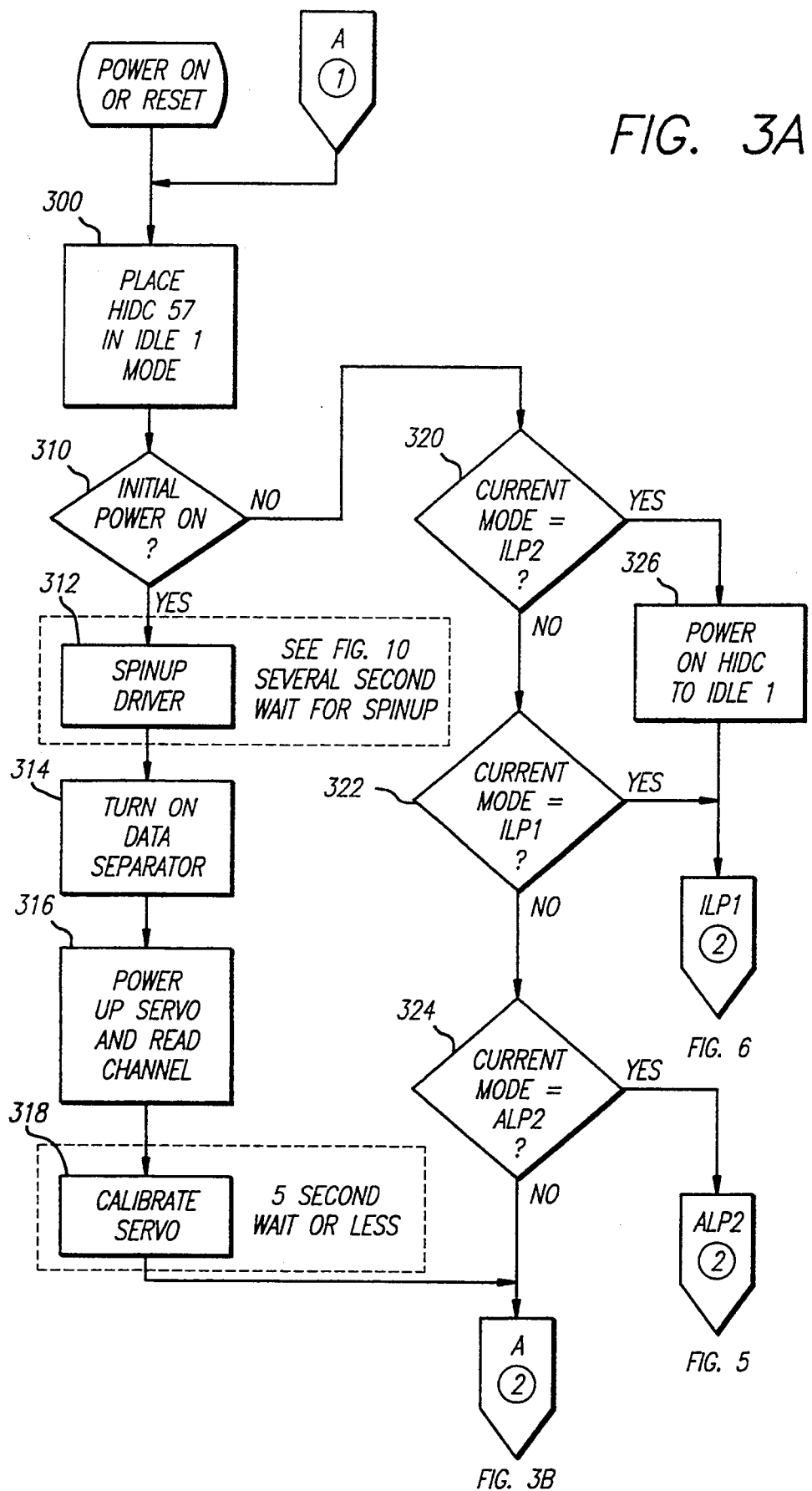
FIGS. 3A and 3B are more detailed logic flow charts of a preferred embodiment of the ACTIVE mode.
Figure 3B:
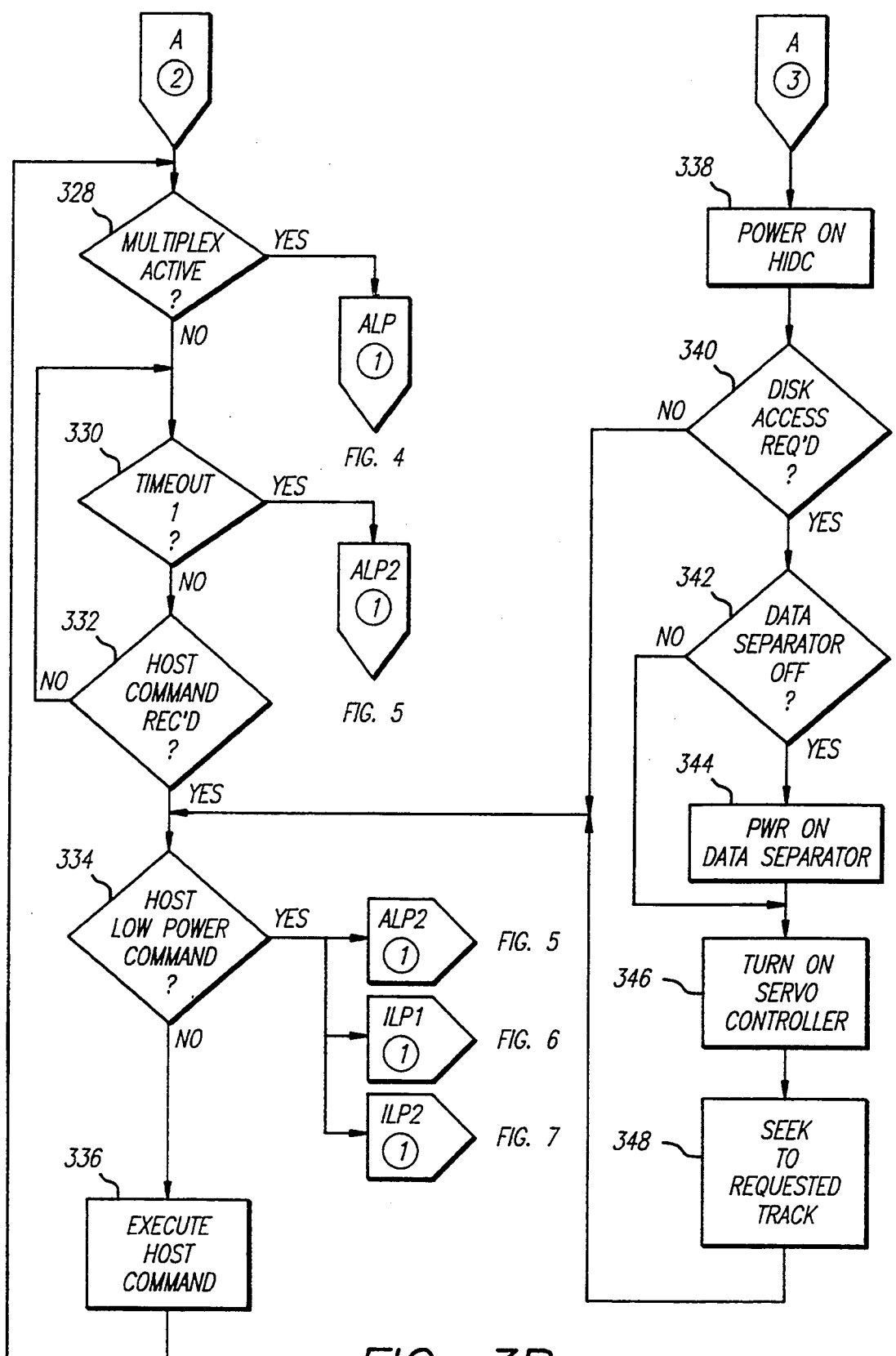

FIGS. 3A and 3B in combination illustrate a preferred embodiment of the ACTIVE mode operational sequence. Starting at the initial state 300 illustrated in FIG. 3A, following either a power on or reset in response to an activation from ILP 2, the Host Interface and Disk Controller (HIDC) 57 is placed into a mode (Idle 1) wherein the HIDC responds to commands from the host. At step 310, the drive logic proceeds to an "initial power on?" decision point. If the query at step 310 is answered yes, then the drive proceeds to step 312. At step 312, only the circuitry necessary to allow spin up of the spindle drive are enabled, as illustrated in Table 3. As shown in Table 3 in a preferred embodiment, during spin up, the HIDC 57 is in "idle 1", the data separator 24 is in a "default" state (power up or off), the A to D section 47 is off, the pulse detector 23 is off, the preamp 18 is off and the actuator is off. The spindle and spindle controller in turn are on. Spin up of the spindle drive motor requires approximately a five to seven second wait time. As discussed in more detail in relation to FIG. 10, the spin up procedure at step 312 preferably follows a power saving routine.

Following spin up of the spindle drive, at step 314 the drive places the data separator 24 into a normal operating mode. Next at step 316, the HIDC 57 and servo and read channels are powered up and the actuator enters a calibration routine at step 318. This step reads initial calibration data stored on the drive during "burn in" of the drive, and the servo functions are calibrated based upon this data. Step 318 may require a several second wait time (e.g. approximately five seconds of wait time). Following this step, the control logic proceeds to point A ② (FIG. 3B).

Returning to Step 310, when the "initial power on?" question is answered negatively, the drive operation sequence proceeds to a "current mode=ILP2?" decision at step 320. If the system is not in the ILP2 mode, then the system next queries if the "current mode=ILP1" at step 322. If the "current mode" is not ILP1 then the system proceeds at step 324 to a decision point of interrogating whether or not the current mode is ALP2. If the answer is no, the system goes to branch A ② (FIG. 3B).

Returning momentarily to the "current mode" equals ILP2 interrogation point 320, an affirmative response directs the system to step 326 where it switches the HIDC 57 into an Idle 1 mode. Following power up of the HIDC 57, the system is in a state equivalent to ILP1 and proceeds to the ILP1 ② branch (discussed below in relation to FIG. 6). Similarly, if the "current mode=ILP1" query is answered affirmatively, then the system also proceeds to the ILP1 ② branch (FIG. 6). If the current mode equals ALP2 question is answered affirmatively then the system proceeds to the ALP2 ② branch (discussed below in relation to FIG. 5).

Referring to FIG. 3B, at the "multiplex active?" decision step 328, an affirmative response directs the system to proceed to the ACTIVE LOW POWER mode ALP1 ① branch (FIG. 4) while a negative response directs the system to step 330, the "Timeout 1?" decision point. At the Timeout 1 decision point, an affirmative response directs the system to the ALP2 ① branch (discussed in relation to FIG. 5) while a negative response directs the system to a "host command received?" decision point at step 332. If no host commands are received then the system returns to step 330 (the timeout 1 decision point). If a host command is received, the system queries if the command is a low power mode command at step 334. If the command is a low power command, then the commanded power mode (either ALP2, ILP1 or ILP2) is initiated at this point, and the system exits to a selected power mode branch. If the host command is determined at step 334 not to be a low power command, the system proceeds to execute the host command at step 336. Following execution of the host command at step 336, the system returns to the beginning of the A ② branch at step 328.

On the A ③ branch of the ACTIVE mode illustrated in FIG. 3B, starting from a ILP1, ALP1 or ALP2 mode, the system proceeds at step 338, to power on the HIDC 57, and then at step 340 to interrogate whether disk access is required. If disk access is not required, then the system proceeds to step 334, the host low "power mode command?" decision point, in branch A 2 of the ACTIVE mode discussed above. If disk access is required, then the system inquires at step 342 whether the data separator 24 is on or off. If the data separator 24 is off, then a command is issued at step 344 to place the data separator in an active operating mode. If in response to the interrogation at step 342, the response is that the data separator 24 is on, the turn on command step 344 is bypassed. At step 346, the servo controller section 41 is turned on (in a duty cycling mode) and the system proceeds to seek the requested track within the disk at step 348. Following location of the requested track, the system proceeds to step 334 at the A ② branch of FIG. 3B and subsequently to the "execute host command" step 336.

This active mode of operation in FIG. 3B is circulated while the host is requiring data input or output. When no data input or output request occur for a specified time (Timeout 1), or a host command switches the system into one of the ALP2, ILP1 or ILP2 modes of operation, the drive will exit the ACTIVE mode at one of points 328, 330 or 334.

FIG. 4 illustrates the ACTIVE LOW POWER 1 logic flow chart. The ACTIVE LOW POWER (ALP1) mode is entered following completion of a data input or output command, as illustrated at branch point ALP1 ① (at the top left of FIG. 4). At step 400, the HIDC 57 is first put into an Idle 1 mode wherein the HIDC 57 can respond to commands or a reset, and the disk controller output drivers are operating at normal, but the remainder of the disk controller circuitry is off. Next, at step 410 the servo controller 41 is placed into a mode where the power is cycled to read channel 19 and the preamp 18 of the HDA. For example, a 15 percent "on", 85 percent "off" sequence may be employed to maintain the heads on a desired cylinder while saving power. Also, servo controller section 41 may optionally be cycled. Next, at step 412, the microcontroller 36 is placed into an Idle 1 power down mode. As indicated at step 414 the microcontroller 36 will wake up following a suitable command, e.g. an enable command, a servo command, or a reset or timer interrupt signal. Following one of these wake up signals, the microcontroller 36 is reinitiated at step 416. Next, at step 418, if a servo interrupt is commanded, the system proceeds to a servo function execution step 420 wherein servo burst information is read from the disk and an adjustment of the actuator position is made if necessary for track following.

If no servo interrupt is determined to have occurred at step 418 then the system proceeds to a command interrupt decision 422. If a host command interrupt has been received the system proceeds to the ACTIVE power mode at branch A ③ described above in relation to FIG. 3B. If a host command interrupt is not received at step 422 the system goes to a timeout interrogation at step 424. If the Timeout 1 interval has lapsed since a data input or output command, the system will respond by switching into the ALP2 mode, described at branch ALP2 ① of FIG. 5, discussed below. If the timeout 1 interval has not been satisfied at step 424, the system proceeds to a data separator 24 timeout decision at step 426. If following a preset time interval there is no data input or output commands, then the data separator 24 is cycled into the "power off" mode at step 428. If the data separator timeout interval has not lapsed since a previous data input/output command, the system bypasses the "power off" step 428 and returns the system to step 412.

Figure 5:
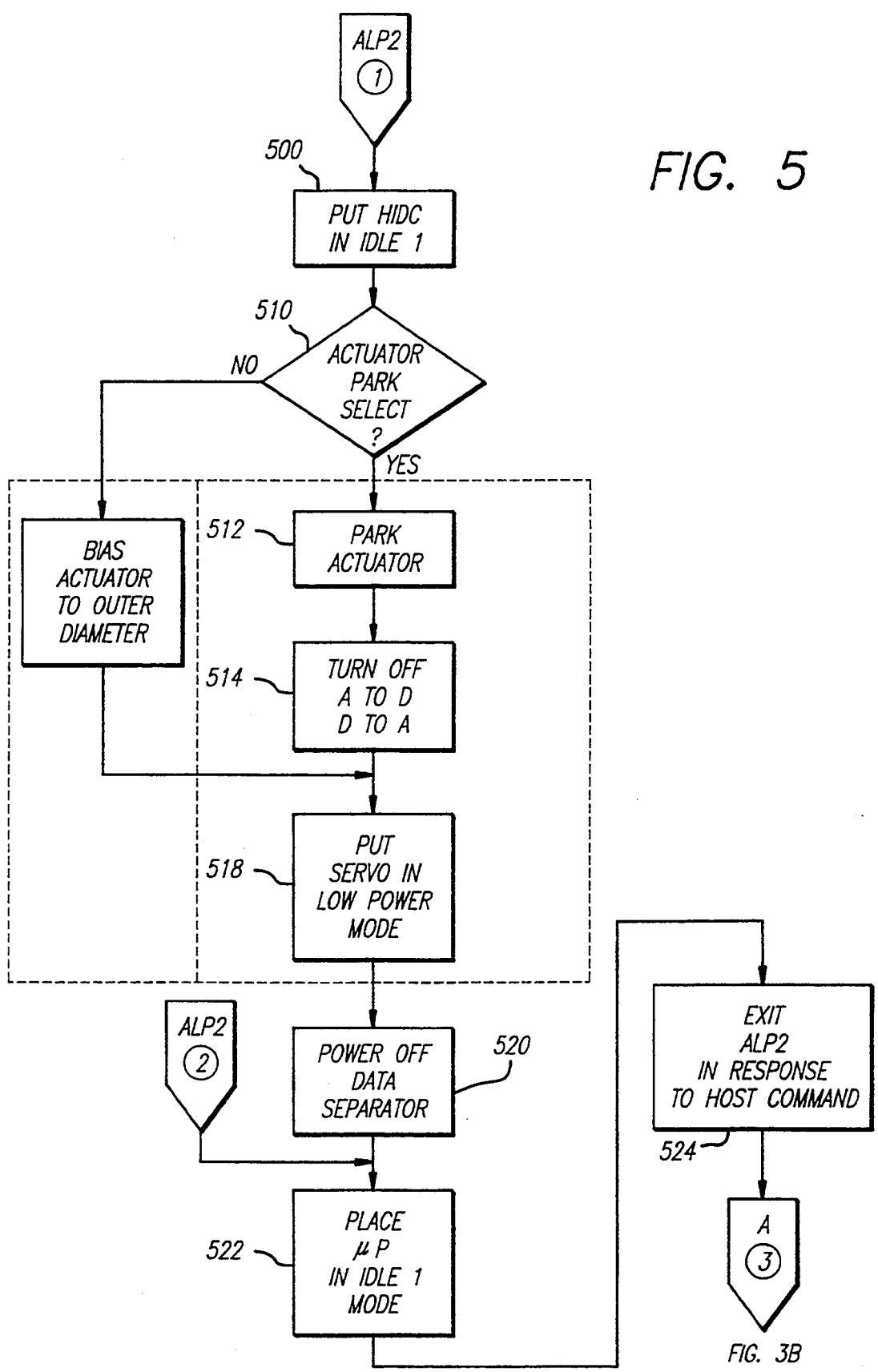
FIG. 5 is a flow chart of a preferred embodiment of the ACTIVE LOW POWER 2 mode.
Figure 6:
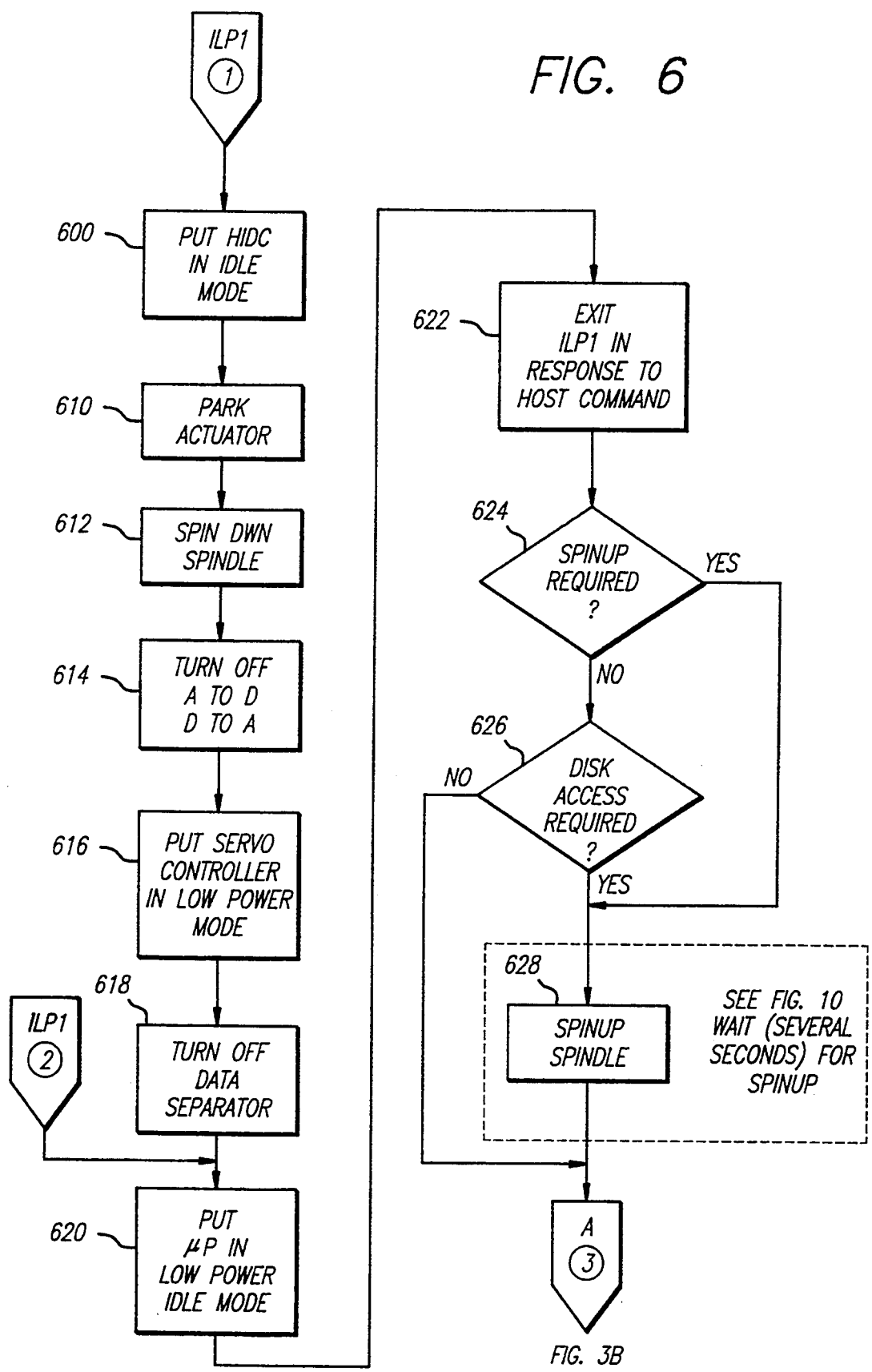
FIG. 6 is a flow chart of a preferred embodiment of the INACTIVE LOW POWER 1 mode.

FIG. 5 illustrates the ALP2 mode of operation. In the ALP2 mode, which is entered when an ALP2 Mode command is received or when the inactivity timeout from the active mode is selected, the system proceeds at step 500 to place the HIDC 57 in the Idle 1 mode described above. Next, at step 510 the "actuator park" interrogation is made. This step allows the actuator position during ALP2 to be set by the drive firmware. If step 510 is set "yes" by the firmware the drive proceeds to park the actuator assembly at step 512 and turn off the analog to digital and digital to analog converters 47, 48 within the servo controller section 41. If the decision at step 510 is no, then the actuator assembly is biased against the mechanical stop at the outer diameter of the storage disks, adjacent cylinder "0", at step 516. Following either of these two steps, the servo controller section 41 is placed in a low power mode where all but the spindle control circuitry is off, except for a small current to bias the actuator against the stop. Alternatively, the actuator may be allowed to simply reach an equilibrium point over the disks after the servo section is disabled. Next, the data separator 24 is powered off at step 520. Following powering down of the data separator 24, the microcontroller 36 is placed in a low power Idle 1 mode at step 522. In response to any host commands, the ALP2 Mode will be exited at step 524 and the system will be returned to the ACTIVE state at branch A 3 (discussed above).

FIG. 6 illustrates the logic flow chart for a preferred embodiment of the INACTIVE LOW POWER 1 mode (ILP1). ILP1 is entered when an ILP1 (or ILP1 with timer command) is received from the host. Alternatively, ILP1 may be entered from the ILP2 mode when a reset is received while in ILP2. At step 600, the HIDC 57 is placed in a low power Idle 1 mode wherein the host interface is active. At step 610 the actuator is parked, and at step 612 the spindle drive motor is spun down and braked. At step 614 the analog to digital and digital to analog converters 47, 48 of the servo controller section 41 are shut down. At step 616 the servo controller is placed in a low power mode. Next, at step 618, the data separator 24 is powered down. At step 620 the system proceeds to place the microcontroller 36 in its second low power mode Idle 2. The microcontroller 36 will wake up from the Idle 2 state upon receipt of a host command interrupt (or reset command). Following receipt of a host command at step 622, the ILP1 mode will halt. As part of the low power mode exit routine, the system will proceed to interrogate at step 624 whether a spinup of the spindle drive motor is required. If spin up is required, then the spinup drive function is initiated at step 628. (See FIG. 10.) If not, then the system interrogates at step 626 whether a disk access is required. If access is required, then the spinup drive function is initiated at step 628. If no disk access is required the system proceeds to the ACTIVE mode at branch A ③, described above.

Figure 7:
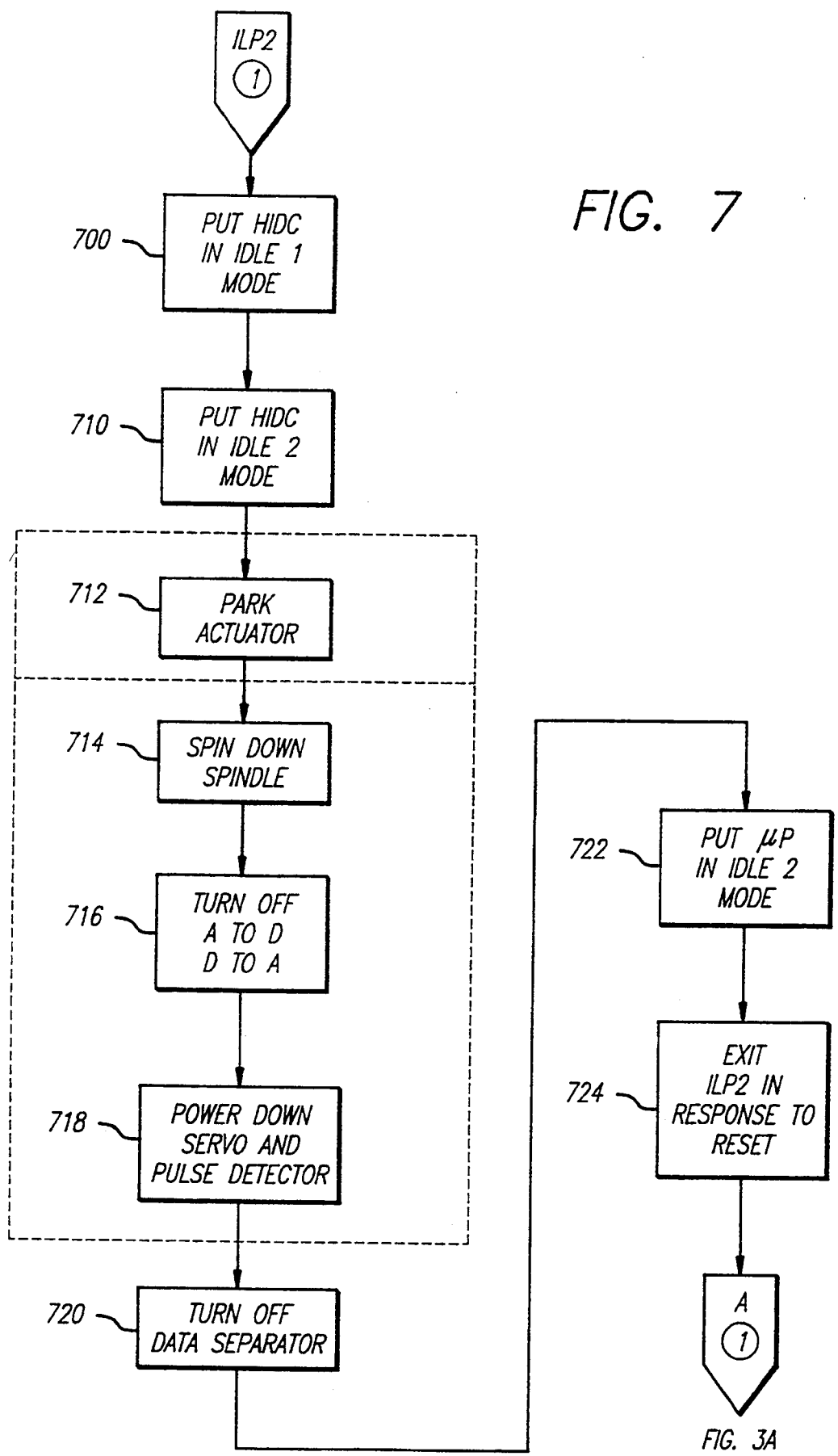
FIG. 7 is a flow chart of a preferred embodiment of the INACTIVE LOW POWER 2 mode.

FIG. 7 illustrates a flow chart for INACTIVE LOW POWER Mode 2 (ILP2). ILP2 is entered upon a specific command (ILP2) from the host computer. In ILP2, the system first places the HIDC 57 in a first low power Idle 1 mode at step 700. In the Idle 1 mode the HIDC host interface still responds to all host commands. At step 710 the HIDC is powered down to a second lower power state, Idle 2 in which the host interface responds only to a reset command. Next, at step 712, the actuator is shut down and parked. At step 714, the spindle is spun down and braked. At step 716, the analog to digital and digital to analog converters of the servo controller section 41 are powered down, and at step 718 the servo controller is shut off or is placed in a low power mode and the pulse detector is turned off. Following shut down of the servo system, the data separator is shut down at step 720 and the microcontroller 36 is put into a second level low power mode Idle 2 at step 722. The system will remain in ILP 2 until a reset is initiated and the system is returned to the beginning of the ACTIVE state at branch A ①.

Figure 8:
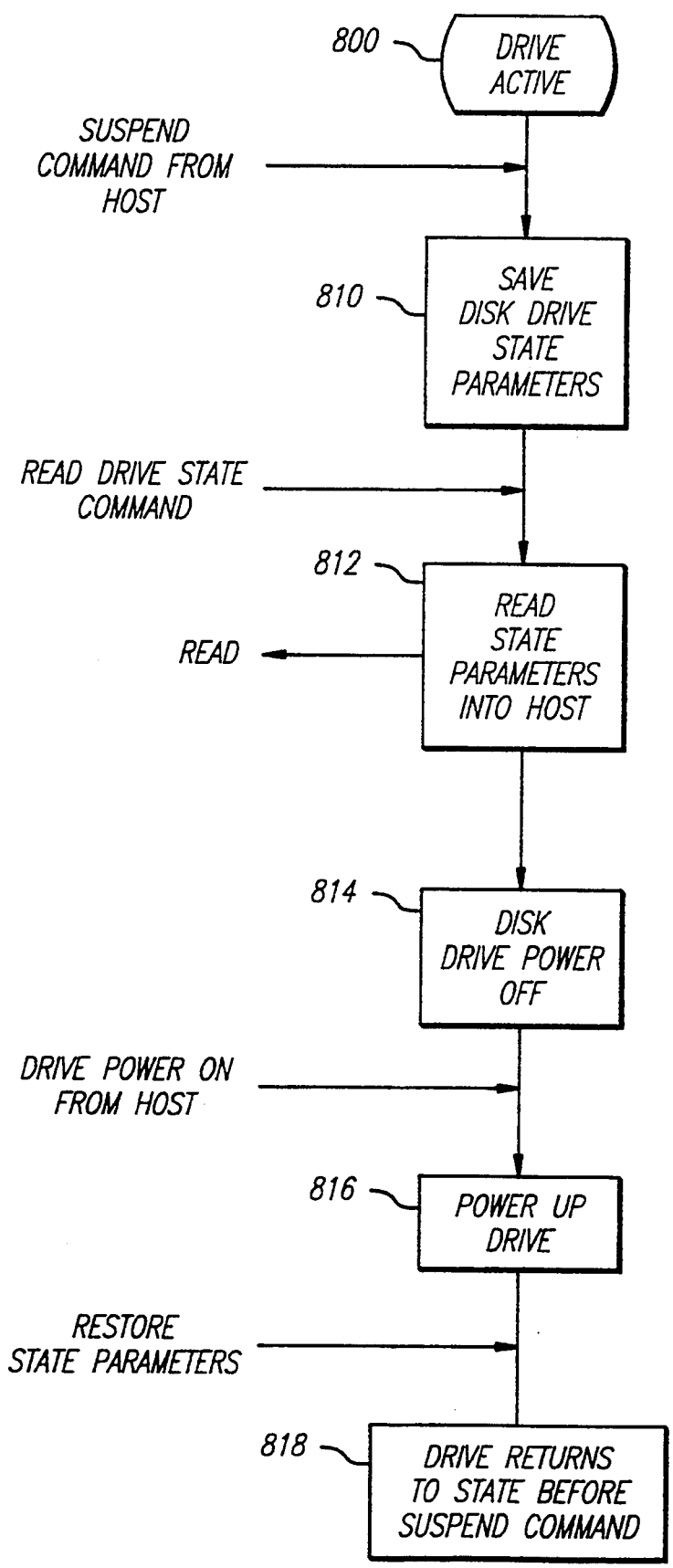
FIG. 8 is a flow chart of a disk drive power down mode initiated by the host computer which saves the disk drive operational state.

Referring to FIG. 8, a basic flow chart illustrating the entry and exit from additional operational state, corresponding to a drive power down, in accordance with a preferred embodiment of the present invention is shown. The power down state illustrated in FIG. 8 is a host initiated power down wherein the host completely removes the power supply to the disk drive, e.g. in response to activation of the suspend switch 87 on the host computer by the user. In this power down procedure of the present invention, the operation state of the drive is saved in the host so that when the drive is subsequently powered up by the host, the drive may resume its prior operational state automatically, thus appearing to the user to have been "suspended" or "frozen" in its state by the power down command.

More specifically, referring to FIG. 8, the power down sequence illustrated may be entered from an initial state where the drive is active or one of the above described low power modes (other than ILP2 which requires a reset to receive host commands). These possible entry states are illustrated by step 800, shown as an ACTIVE mode for illustration only. In response to activation of the switch 87 on the host computer by the host operator indicating the desire to suspend operation of the disk drive, a suspend command is issued from the host to the drive. Upon receiving the suspend command from the host, the disk drive, at step 810, saves its current operational state parameters. These operational state parameters will include the disk cylinder and track being followed by the disk drive, the operational state of the key electrical components corresponding to the status of one of the modes illustrated in Table 2, and any other parameters necessary to fully define the operational state of the drive. For example, a 512 byte block of data may be saved by the disk drive to specify the details of the drive state parameters. Alternatively, the state parameter data may be stored in a non-volatile memory in the disk drive. The host then issues a drive state read command to the disk drive causing the drive to transfer the drive state parameters to the host, at step 812 illustrated in FIG. 8. After the drive state parameters have been transferred to the host, and stored in the host RAM 86, the host shuts off power to the drive, as illustrated in step 814. The disk drive actuator will be automatically parked and latched in the landing zone as part of the drive power off protocol if not already parked and latched (e.g. by virtue of being in ILP1 at time of the suspend command). After lapse of a time period, determined by the user, which may be minutes, hours or even days, the user activates the resume switch 87 on the host computer causing the host computer to restore power to the disk drive as illustrated at step 816. After the drive has powered up at step 816, the host issues a "restore state parameters" command to the drive along with the 512 byte block of state parameter data stored in the host RAM. Upon receipt of the operational state parameters at step 818, the drive automatically returns the disk drive operational state to the precise state prior to the suspend command by use of the operational state parameters.

Accordingly, it will be appreciated that the drive power down procedure illustrated in FIG. 8 provides complete power shut off to the disk drive, and attendant power savings, while preserving the disk drive status so as to allow the drive to resume precisely its operational state even after an extended period of time. This provides significant advantages, especially in a battery powered portable host computer where the additional power savings between ILP1 or ILP2 and full power down of the disk drive can be very significant for increased battery lifetime.

Figure 9:
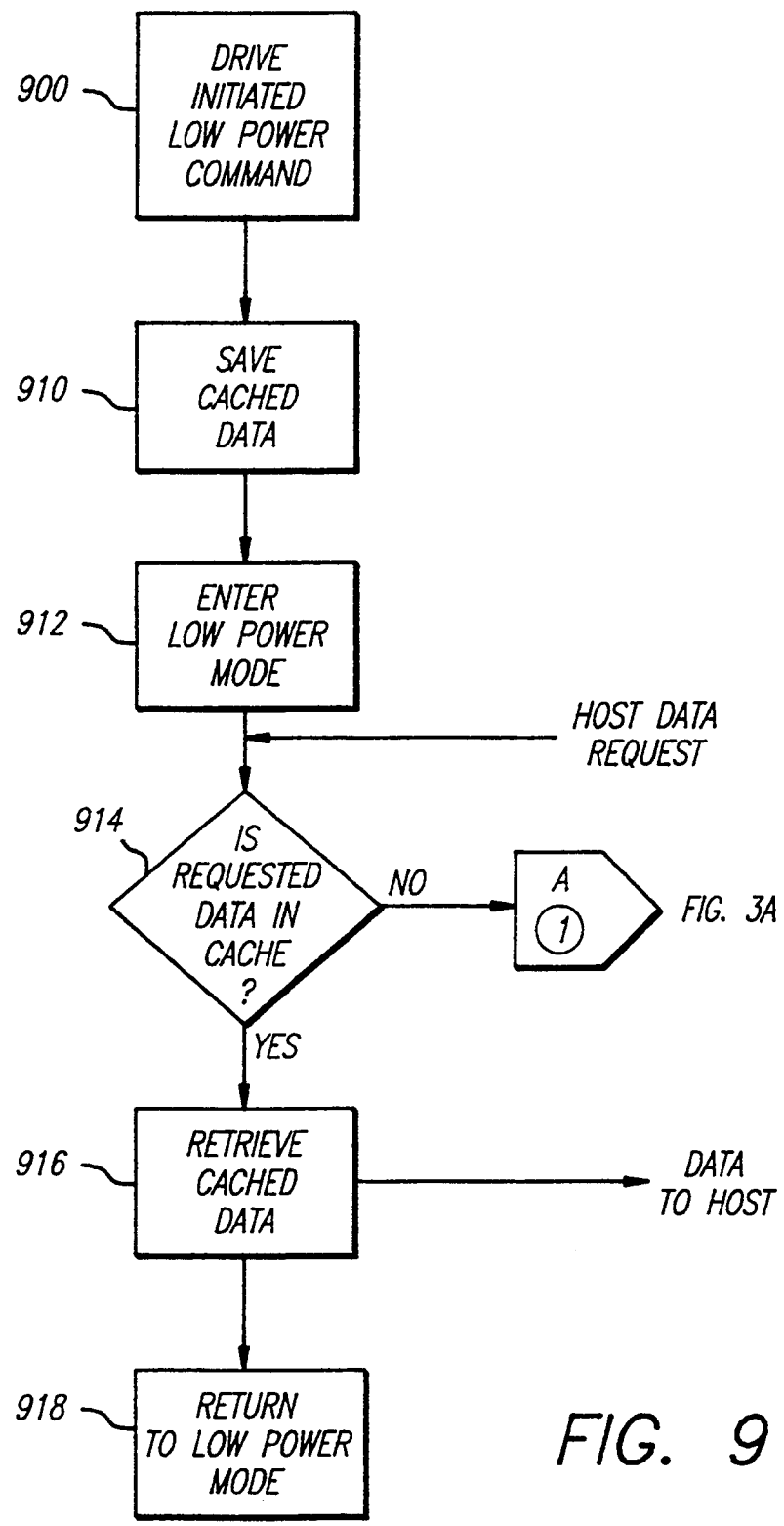
FIG. 9 is a flow chart of a low power spindle start up procedure in accordance with a preferred embodiment of the present invention.

Referring to FIG. 9, a flowchart of the basic steps of a data caching and retrieval method in accordance with the present invention is illustrated. In the caching and data recall procedure of FIG. 9, the present invention provides the ability to avoid full power up of the disk drive in response to a host data request in a percentage of occurrences of such requests, which percentage may be significant for some host computer applications. For example, in some applications commonly run on host computers, the same data is requested repeatedly during the running of the application program. In such applications, the disk drive may be repeatedly accessed to retrieve the same data for the program. Also, in many applications, large blocks of data are required for the applications, which blocks are retrieved in sequential segments from the disk drive at several different stages in the application program. In the present invention as set out in FIG. 9, this characteristic is exploited in a low power mode by first saving data in a disk drive cache memory. The cache memory may be a portion of RAM 39 or buffer memory 66 as illustrated in FIG. 1, allocated by the microcontroller (or HIDC) for caching, and may vary in size with varying host data requests. This cached data, for example, may be the data last accessed and read by the host and/or may include sequential data on the disk following the data last accessed by the host computer, to take advantage of the above-noted types of application programs data request characteristics.

Thus, as illustrated in FIG. 9, when a disk drive initiated low power mode is to be entered, as illustrated at step 900, the cached data is saved at step 910. That is, the portion of the drive memory allocated for storing the cached data is maintained in a power on state irrespective of the status of the rest of the disk drive control circuitry in the specific low power mode being initiated in step 900. After the cached data is saved in the disk drive, the disk drive enters the low power mode at step 912. In response to the next data request received from the host, the drive first determines at step 914 whether the requested data is located in the cached data block. If the requested data is not present in the cache the drive proceeds to the ACTIVE mode as illustrated at branch A (1) in FIG. 9. However, if the requested data is in the cache, the data is retrieved and transferred to the host at step 916. If the low power mode at which the drive is in when the data request is received is such that the HIDC circuitry 57 is powered down so that data transfer to the host is not possible, at step 916, the HIDC 57 circuitry is first powered up and the cached data is transferred to the host. Also, if the microcontroller 36 is powered down in the low power mode from the disk drive when the host data request is received, it will need to be powered on in step 916 prior to the data transfer to the host. Thus, as illustrated in Table 3, in the cache data access state, the majority of the disk drive control circuitry may be off while nonetheless complying with the host data request.

At step 918, illustrated in FIG. 9, after the data request is satisfied by the disk drive from the cached data, the drive may fully return to the low power mode present before the data request if in an ACTIVE mode (i.e. ALP1 or ALP2). If in an inactive low power mode, the drive preferably goes at step 918 to an active low power mode in anticipation of a further host command.

Accordingly, it will be appreciated that the cached data access procedure illustrated in FIG. 9 can significantly reduce the power requirements of the drive.

Referring to FIG. 10, a preferred embodiment of a low power spindle startup procedure is illustrated in a basic flowchart form. The spindle startup procedure is a relatively power intensive portion of the power up procedure of the drive required after exiting a low power mode such as ILP1 or ILP2, or after initial power on of the drive. A key consideration during spindle startup is that sufficient power must be provided to overcome stiction between the read/write heads and the disk surface where the heads are parked when the disk drive spindle motor is off. The amount of power to overcome such stiction cannot be specified with any preciseness, however, since it depends upon the specific disk surface/read-write head interaction which will vary with the length of time the heads have been parked, the temperature of the disk surface when the heads were parked, as well as the precise roughness of the disk surface at the particular position where the heads are parked. Conventionally, a large current surge is applied to the spindle motor for several seconds during initial spin up to ensure stiction is overcome. Nonetheless, Applicants have discovered that a maximum current to the spindle motor which is certain to overcome the stiction between the heads and disk surface is very wasteful of power in the majority of startup circumstances. Rather, a relatively low current may be successfully employed in a majority of the startup attempts; for example, a 600 milli-amp start may provide a 95 percent or greater success rate while using only approximately two-thirds of the power (900 milli-amp) which would normally be used to achieve startup. In the relatively small percentage of attempts where the low power start is unsuccessful, the startup is reattempted with a higher power current supplied to the spindle motor. While a two-tiered system of start-up power levels is of significant benefit, three or more levels of startup power may also be employed.

More specifically, referring to FIG. 10, at step 1000 the disk drive receives a command to initially power on or exits a power mode (i.e. ILP1 or 2) wherein the spindle is stopped and the actuator parked. In response to such a command, the spindle startup procedure is initiated at step 1010. Next, at step 1020, the drive microcontroller 36, spindle controller circuitry 41 and spindle driver 14 are enabled. At step 1030, the drive microcontroller 36 initiates a low power spindle startup, for example employing approximately two-thirds current normally employed for spindle startup and flying of the read/write heads. (E.g. 600 milli-amps.) Typically, a full spindle spinup procedure takes approximately five to seven seconds, with the current profile to the spindle motor being initially a very high power current to break stiction, followed by a decreasing current while the spindle motor accelerates to full speed. Whether or not the low power spindle startup was successful is determined, for example after several seconds, as indicated in step 1040. If at step 1040 it is determined that the spinup was not successful, the drive proceeds to retry the spindle startup procedure at a higher power at step 1050. In the embodiment illustrated in FIG. 10, three levels of spindle startup power are provided. Accordingly at step 1050 an intermediate level between a full power start and the low power startup at step 1030, for example an 80 percent power level, may be employed. (e.g. 750 to 800 milli-amps.) After one or two seconds the success of the startup procedure is again tested at step 1060. If the spinup was once again unsuccessful the drive then proceeds to try the full power spindle startup procedure at step 1070. (e.g. 900 to 1000 milli-amps.) The spinup success is again tested at step 1080. In the unlikely event that the full power spindle startup attempt is not successful then step 1070 is repeated as illustrated in FIG. 10.

In the event that the "spinup successful?" interrogation at steps 1040, 1060 or 1080 is "yes", the drive then proceeds to the next step 1100. As illustrated in the specific circuitry power status chart during spinup shown in Table 3, nonessential circuits are disabled during the spinup as illustrated in FIG. 10. This represents a further power conserving feature of the present invention since during spinup of the drive, no data may be read off of the disk surfaces and the actuator is latched at the inner landing zone region of the disks. (In this regard, a slight current to the actuator may be necessary during the first few milliseconds of spindle startup since otherwise the head/disk stiction may tend to pull the head out of the latch at the inner diameter of the disk). As noted in FIG. 10 step 1100, the disabled read channel circuitry 19 and servo controller circuitry 41, must first be enabled prior to proceeding to full active status for the drive (branch A ①).

Accordingly, it will be appreciated that the present invention provides a series of power saving features adapted for use with a rotating disk magnetic data storage device which collectively can provide significant power savings for the disk drive. Additionally, the reduced power consumption of the disk drive significantly reduces heat generation by the disk drive allowing potential problems in high density circuitry in modern day host computers to be reduced, also reducing the need for attendant cooling systems.

It will be appreciated that the foregoing description of the present invention is of a presently preferred embodiment of the various power saving modes and their entry and exit, and, a wide variety of modifications and combinations of the various modes illustrated may be provided while remaining within the scope of the present invention. Accordingly, the foregoing description of the preferred embodiment should be viewed as illustrative in nature and not limiting of the present invention in any way.

What is claimed is:

1. In a rotating disk data storage device, adapted for use with a host computer, said data storage device having:
    one or more rotatable data storage disks each having a plurality of concentric data tracks on one or more disk surfaces thereof;
    a spindle for rotatably supporting said data storage disks;
    a spindle motor for rotationally driving said spindle;
    an actuator for supporting one or more read/write transducer heads adjacent said one or more disk surfaces;
    an actuator motor for moving said actuator and read/write transducer heads to radial data tracks on said disk surfaces;
    a microcontroller for controlling and monitoring the data storage device functions, said microcontroller including a read only memory having a number of control programs written therein and a random access memory for temporary data storage;
    read channel circuitry for receiving and amplifying data and servo signals read from the disk surfaces by said read/write transducer heads;
    servo system controller circuitry for employing servo information read from said disk surfaces to control said actuator motor to position said read/write heads over desired data tracks in response to host commands;
    spindle motor driver and control circuitry for driving said spindle motor so as to rotate said data disks at a desired rotational velocity; and
    host interface/disk controller circuitry for receiving host commands and data to be written on said disk surfaces from said host computer and for converting said data to a format suited for writing onto said disk surfaces and for providing data read from said disk surfaces to said host computer in response to host read commands;
    the method for controlling said disk drive so as to reduce the power consumption thereof, comprising the steps of:
    initiating a timer function after completion of execution of a host computer read/write command, said timer function having a timeout after a predetermined period of time;
    after completion of said predetermined period without receipt of a host read/write command, wholly or partially disabling said read channel circuitry, servo controller circuitry, and actuator motor and placing said host interface/disk controller circuitry in a low power mode capable of receiving all host commands from said host computer.

2. A method for controlling a disk drive as set out in claim 1, further comprising the step of, immediately after said completion of execution of a host read/write command, cycling the power supply to a selected portion of said read channel circuitry and maintaining the read/write transducer heads over the last data track accessed in response to said host computer read/write command.

3. A method for controlling a disk drive as set out in claim 1, wherein said circuitry includes complimentary metal oxide semiconductor devices which receive clock signals and wherein said disabling step comprises turning off said clock signals to some or all of said complimentary metal oxide semiconductor devices.

4. A method for controlling a disk drive as set out in claim 1, further comprising the step, after said disabling steps, of, receiving a host read/write command and, in response to the host read/write command, re-enabling said read channel circuitry, said servo controller circuitry, and said actuator motor and re-enabling full power operation of said host interface/disk controller circuitry.

5. A method for controlling a disk drive as set out in claim 1, further comprising the step of, initiating a second timer function having a second timeout period, and after completion of said second timeout period without receipt of a host read/write command, disabling said spindle control circuitry and said spindle motor.

6. A method for controlling a disk drive as set out in claim 1, further comprising the steps of, receiving an inactive low power mode command from the host computer, and in response to the command from the host computer, disabling the spindle motor and the spindle motor driver circuitry.

7. A method for controlling a disk drive as set out in claim 1 wherein said microcontroller has a first low power mode of operation, and said method further comprises placing said microcontroller in said first low power mode of operation after said predetermined time of inactivity.

8. A method for controlling a disk drive as set out in claim 7, wherein said microcontroller has a second low power mode of operation having lower power consumption than said first low power mode, and said method further comprises placing said microcontroller in said second lower power mode of operation after a second predetermined time of inactivity.

9. A method for controlling a disk drive as set out in claim 6, wherein said method further comprises the step of, receiving a host read/write command, and, in response thereto, re-enabling said spindle motor, spindle motor driver circuitry, read channel circuitry and servo control circuitry.

10. A method for controlling a disk drive as set out in claim 1, further comprising the step of, receiving an inactive low power command from the host computer and, in response to said command, immediately disabling said servo controller circuitry, said spindle motor driver circuitry, said read channel circuitry, placing said microcontroller in a low power mode, and disabling said host interface/disk controller circuitry so as to be unresponsive to all host commands other than a reset command.

11. A method for controlling a disk drive as set out in claim 10, further comprising the step of, receiving a reset command from said host computer and in response to said reset command activating said host interface circuitry so as to be responsive to all host commands.

12. A method for controlling a disk drive as set out in claim 11, further comprising the step of, after said step of receiving said reset command, receiving a host read/write command and, in response thereto, restoring said read channel circuitry, said spindle motor driver circuitry and said servo controller circuitry to fully active status.

13. A method for controlling a disk drive as set out in claim 1, wherein said step of wholly or partially disabling said servo controller circuitry and actuator motor comprises providing a low power bias current to said actuator to maintain said actuator against a mechanical stop adjacent to the outer diameter of said disk surfaces.

14. A rotating disk data storage device, adapted for use with a host computer, comprising:

one or more rotatable data storage disks each having a plurality of concentric data tracks on one or more disk surfaces thereof;
a spindle for rotatably supporting said data storage disks;
a spindle motor for rotationally driving said spindle;
an actuator for supporting one or more read/write transducer heads adjacent said one or more disk surfaces;
an actuator motor for moving said actuator and read/write transducer heads to radial data tracks on said disk surfaces;
a microcontroller for controlling and monitoring the data storage device functions, said microcontroller including a read only memory having a number of control programs written therein and a random access memory for temporary data storage;
read channel circuitry for receiving and amplifying data and servo signals read from the disk surfaces by said read/write transducer heads;
servo system controller circuitry for employing servo information read from said disk surfaces to control said actuator motor to position said read/write heads over desired data tracks in response to host commands;
spindle motor driver and control circuitry for driving said spindle motor so as to rotate said data disks at a desired rotational velocity;
host interface/disk controller circuitry for receiving host commands and data to be written on said disk surfaces from said host computer and for converting said data to a format suited for writing onto said disk surfaces and for providing data read from said disk surfaces to said host computer in response to host read commands;
timer means for providing a timeout signal after a predetermined period of time after completion of execution of a host computer read/write command; and
means for receiving said timeout signal and, in response thereto, wholly or partially disabling said read channel circuitry, servo controller circuitry, and actuator motor, and placing said host interface/disk controller circuitry in a low power mode capable of receiving all host commands from said host computer.

15. In a rotating disk data storage device, adapted for use with a host computer, said data storage device having:

one or more rotatable data storage disks each having a plurality of concentric data tracks on one or more disk surfaces thereof;
a spindle for rotatably supporting said data storage disks;
a spindle motor for rotationally driving said spindle;
an actuator for supporting one or more read/write transducer heads adjacent said one or more disk surfaces;
an actuator motor for moving said actuator and read/write transducer heads to radial data tracks on said disk surfaces;
a microcontroller for controlling and monitoring the data storage device functions, said microcontroller including a read only memory having a number of control programs written therein and a random access memory for temporary data storage;

read channel circuitry for receiving and amplifying data and servo signals read from the disk surfaces by said read/write transducer heads;

servo system controller circuitry for employing servo information read from said disk surfaces to control said actuator motor to position said read/write heads over desired data tracks in response to host commands;

spindle motor driver and control circuitry for driving said spindle motor so as to rotate said data disks at a desired rotational velocity; and host interface/disk controller circuitry for receiving host commands and data to be written on said disk surfaces from said host computer and for converting said data to a format suited for writing onto said disk surfaces and for providing data read from said disk surfaces to host computer in response to host read commands;

the method for controlling said disk drive so as to reduce the power consumption thereof, comprising the steps of:

detecting completion of a host command; and after detecting completion of a host command, placing said data storage device in a first active reduced power consumption mode wherein the actuator and said read/write transducer head(s) are maintained over a data track.

16. A method as set out in claim 15, wherein said step of placing the data storage device in a first active reduced power mode comprises cycling the power supply to at least a part of said servo system controller circuitry.

17. A method as set out in claim 16, wherein said step of placing the data storage device in a first active reduced power consumption mode further comprises the step of placing the host interface/disk controller circuitry in a first reduced power mode capable of receiving all host commands.

18. A method as set out in claim 17, further comprising the step of placing the microcontroller in a reduced power mode.

19. A method as set out in claim 15, further comprising the step of, a predetermined time after entry into said first active reduced power mode, placing said data storage device in an inactive reduced power mode wherein said spindle motor is allowed to spin down and said host interface/disk controller circuitry is placed in a second reduced power mode capable of receiving a reduced number of host commands.

20. A method as set out in claim 15, further comprising the step of, a predetermined time after entry into said first active reduced power mode, placing said data storage device in a second active reduced power mode having lower power consumption than said first active reduced power mode and wherein said actuator and transducer head(s) are not maintained at a data track.

21. A method as set out in claim 20, wherein said step of placing said data storage device in a second active reduced power mode comprises allowing the actuator to move to an equilibrium position over the disk surface.

22. A rotating disk data storage device, adapted for use with a host computer, comprising:

one or more rotatable data storage disks each having a plurality of concentric data tracks on one or more disk surfaces thereof;

a spindle for rotatable supporting said data storage disks;

a spindle motor for rotationally driving said spindle;

an actuator for supporting one or more read/write transducer heads adjacent said one or more disk surfaces;

an actuator motor for moving said actuator and read/write transducer heads to radial data tracks on said disk surfaces;

a microcontroller for controlling and monitoring the data storage device functions, said microcontroller including a read only memory having a number of control programs written therein and a random access memory for temporary data storage;

read channel circuitry for receiving and amplifying data and servo signals read from the disk surfaces by said read/write transducer heads;

servo system controller circuitry for employing servo information read from said disk surfaces to control said actuator motor to position said read/write heads over desired data tracks in response to host commands;

spindle motor driver and control circuitry for driving said spindle motor so as to rotate said data disks at a desired rotational velocity;

host interface/disk controller circuitry for receiving host commands and data to be written on said disk surfaces from said host computer and for converting said data to a format suited for writing onto said disk surfaces and for providing data read from said disk surfaces to said host computer in response to host read commands; and means for placing said data storage device in a first active reduced power consumption mode, wherein the actuator is maintained over a data track, after completion of a host command.

23. A data storage device as set out in claim 22, wherein said means for placing said data storage device in a first active reduced power mode comprises means for cycling the power supply to at least a part of said servo system controller circuitry.

24. A data storage device as set out in claim 22, wherein said means for placing said data storage device in a first active reduced power mode further comprises means for placing the host interface disk/controller in a reduced power mode capable of receiving host commands.

25. A data storage device as set out in claim 22, further comprising means for placing the microcontroller in an active reduced power mode.

26. A data storage device as set out in claim 22, further comprising means for placing said data storage device in an inactive reduced power mode, wherein said spindle motor is allowed to spin down and said host interface/disk controller is placed in a second reduced power mode capable of receiving a reduced number of host commands, a predetermined time after entry into said first active reduced power mode.

27. A data storage device as set out in claim 22, further comprising means for placing said data storage device in a second active reduced power mode, having lower power consumption than said first active reduced power mode and wherein said actuator is not maintained at a data track, a predetermined time after entry into said first active reduced power mode.

* * * * *